(12) United States Patent
Schwarz et al.

(10) Patent No.: US 10,296,407 B2
(45) Date of Patent: May 21, 2019

(54) METHOD TO DETECT AND TO HANDLE FAILURES IN THE COMMUNICATION IN A COMPUTER NETWORK

(71) Applicant: FTS Computertechnik GmbH, Vienna (AT)

(72) Inventors: Martin Schwarz, Wr. Neustadt (AT); Wilfried Steiner, Vienna (AT); Günther Bauer, Vienna (AT)

(73) Assignee: TTTech Computertechnik AG, Vienna (AT)

( * ) Notice: Subject to any disclaimer, the term of this patent is extended or adjusted under 35 U.S.C. 154(b) by 148 days.

(21) Appl. No.: 15/343,571

(22) Filed: Nov. 4, 2016

(65) Prior Publication Data

US 2017/0132065 A1 May 11, 2017

(30) Foreign Application Priority Data

Nov. 6, 2015 (AT) .............................. A 50948/2015

(51) Int. Cl.
*G06F 11/00* (2006.01)
*G06F 11/07* (2006.01)
(Continued)

(52) U.S. Cl.
CPC ........ *G06F 11/0769* (2013.01); *G06F 11/079* (2013.01); *G06F 11/0709* (2013.01);
(Continued)

(58) Field of Classification Search
CPC .................... G06F 11/1443; G06F 11/1625
See application file for complete search history.

(56) References Cited

U.S. PATENT DOCUMENTS 4,070,648 A * 1/1978 Mergenthaler ............ H04L 1/14
714/18
5,533,034 A * 7/1996 Kuwata ................ H04L 1/1692
714/747

(Continued)

FOREIGN PATENT DOCUMENTS

EP          2400682 A1    12/2011

OTHER PUBLICATIONS

European Search Report dated Feb. 1, 2017 for European Application No. EP 16197106.

*Primary Examiner* — Charles Ehne
(74) *Attorney, Agent, or Firm* — Eversheds Sutherland (US) LLP

(57) ABSTRACT

A method is provided to detect and handle failures in the communication in a network, including a sender (201, 203) and a receiver (202, 501, 502, 503), where communication between the sender and the receiver is message-oriented. The method includes: (a) the sender sending a message (M101, M101-C, M102-C) to the receiver; (b) the sender monitoring the transmission process of the message inside the sender and/or monitoring the message; (c) the sender executing a correctness check of (i) the message, e.g., its contents, and/or (ii) the transmission process of the message inside the sender; and (d) after the correctness check(s) has/have been completed, the sender informs the receiver of the result of the correctness check(s), wherein (e) the receiver of the message marks the message as being faulty and/or discards the message if the result of a correctness check indicates that the message and/or transmission process is faulty.

24 Claims, 8 Drawing Sheets

(51) Int. Cl.
*H04L 1/00* (2006.01)
*G06F 11/14* (2006.01)
*G06F 11/16* (2006.01)

(52) U.S. Cl.
CPC ...... *G06F 11/0751* (2013.01); *G06F 11/1443* (2013.01); *G06F 11/1625* (2013.01); *H04L 1/008* (2013.01); *H04L 2001/0097* (2013.01)

(56) References Cited

U.S. PATENT DOCUMENTS

| | | | | |
|---|---|---|---|---|
| 5,854,994 | A * | 12/1998 | Canada | G01H 1/003 702/56 |
| 6,151,689 | A * | 11/2000 | Garcia | G06F 11/1482 714/18 |
| 2003/0093748 | A1 * | 5/2003 | Kim | H04L 1/0045 714/776 |
| 2003/0126238 | A1 * | 7/2003 | Kohno | H04L 1/0009 709/220 |
| 2007/0147381 | A1 | 6/2007 | Wilhelm | |
| 2008/0195912 | A1 * | 8/2008 | Mende | H03M 13/09 714/752 |
| 2009/0327826 | A1 * | 12/2009 | Inoue | H04L 1/0072 714/748 |
| 2011/0047431 | A1 | 2/2011 | Owaki et al. | |
| 2015/0347218 | A1 * | 12/2015 | Domingues | H04L 1/0061 714/57 |

* cited by examiner

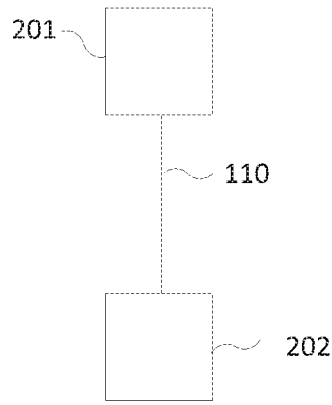
FIG. 1 (State-of-the-art)
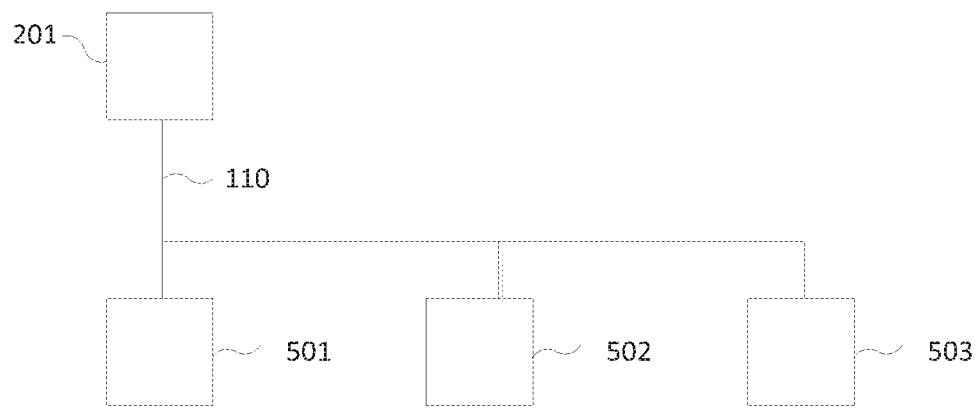
Fig. 1a (State-of-the-art)

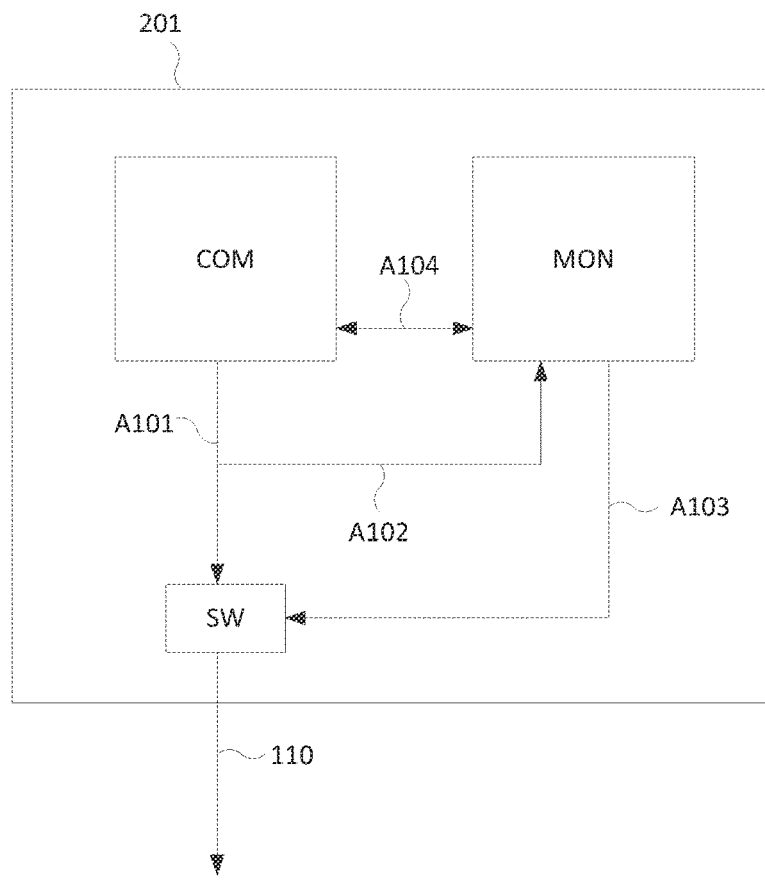
FIG. 2 (State-of-the-art)
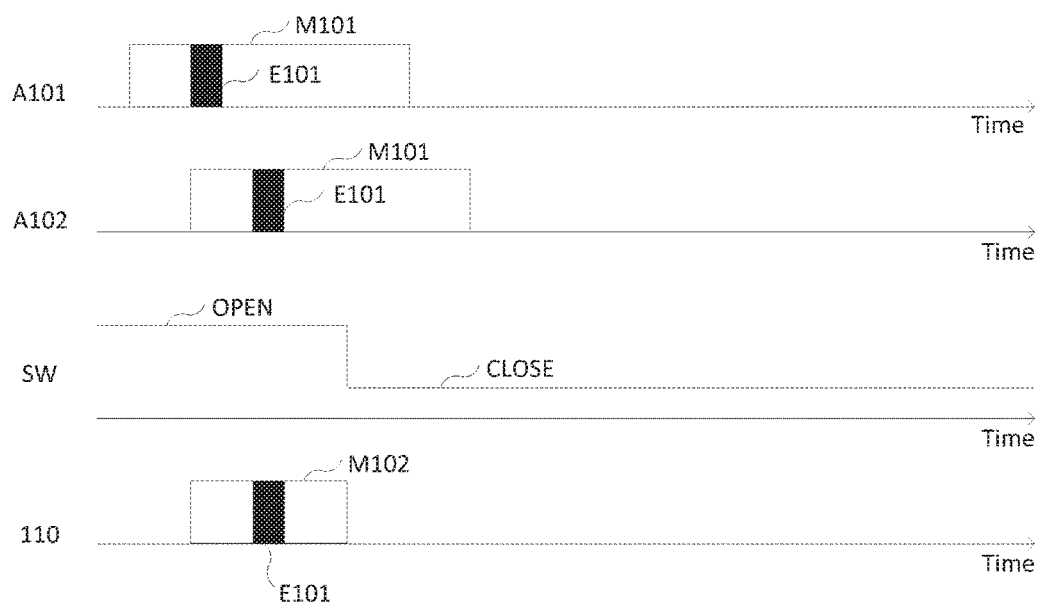
FIG. 3 (State-of-the-art)

METHOD TO DETECT AND TO HANDLE FAILURES IN THE COMMUNICATION IN A COMPUTER NETWORK

This application claims priority to Austrian Patent Application A 50948/2015, filed Nov. 6, 2015, which is incorporated herein by reference.

The invention relates to a method to detect and to handle failures in the communication in a network, in particular a computer network, wherein said network comprises at least one sender and at least one receiver, and wherein the communication between said at least one sender and said at least one receiver is message-oriented.

Furthermore, the invention relates to a network, in particular a computer network, comprising at least one sender and at least one receiver, wherein the communication between said at least one sender and said at least one receiver is message-oriented.

Additionally, the invention relates to a sender as well as to a receiver for such a network.

The invention is in the area of computer systems, in particular in the area of fault-tolerant computing systems. Typically, a network, in particular a computer network, is a part of a computer system. The computer system comprises a number of components, e.g. processors and/or nodes, which are connected by the network.

In fault-tolerant computing systems the detection and correction of failures is of great importance to guarantee the system's operability even in presence of failures. In such systems, components may fail in malicious failure modes, which are hard to tolerate. Thus, the self-checking technique has emerged as a state-of-the-art technique to construct components to fail in more benign failure modes.

According to the state-of-the-art of the self-checking technique a component is designed by two entities, a communication entity and a monitoring entity, wherein the monitoring entity monitors the communication entity. In the case that the monitoring entity identifies a failure of the communication entity it will intercept the output of the communication entity in order to translate a malign failure mode of the communication entity to a benign failure mode. The drawback of this current state-of-the-art is that the reaction time of the monitoring entity to a failure in the communication entity must be prompt. This prompt reaction is difficult to implement an becomes more and more difficult with increasing communication speed.

It is an object of the invention to solve the above described problem.

This problem is solved by the above mentioned method and network in that according to the invention, for detecting and handling failures in the communication in said network,
(a) a sender sends at least one message to at least one receiver, and
(b) said sender monitors the transmission process of said at least one message inside the sender and/or monitors said at least one message, and
(c) said sender executes a correctness check of the said at least one message, in particular of the contents of said at least one message, and/or said sender executes a correctness check of the transmission process of said at least one message inside the sender, and
(d) after the correctness check of said at least one message and/or of correctness check of the transmission process of said at least one message inside the sender has been completed,
said sender informs said at least one receiver of the result of said correctness check or said correctness checks,
and wherein
(e) the at least one receiver of the at least one message marks said at least one message as being faulty and/or discards said at least one message if the result of a correctness check indicates that said message and/or the transmission process of said message inside the sender is faulty.

Furthermore, this problem is solved by a sender and a receiver for such a network, wherein said sender is adapted to
send at least one message to at least one receiver, and
to monitor the transmission process of said at least one message inside the sender and/or said at least one message, and
to execute a correctness check of the said at least one message, in particular of the contents of said at least one message, and/or said to execute a correctness check of the transmission process of said at least one message inside the sender, and
after the correctness check of said at least one message and/or of correctness check of the transmission process of said at least one message inside the sender has been completed—, to inform said at least one receiver of the result of said correctness check or said correctness checks.

A receiver for a network according to the invention is adapted to mark a message received from a sender as being faulty and/or discards said message if the result of a correctness check carried out by said sender indicates that said message and/or the transmission process of said message inside the sender is faulty.

The invention relaxes the reaction time of the monitoring entity to failures of a communication entity. This is, since the information of the sender about the correctness of the message and/or the transmission process is communicated to the receiver only after the transmission process has been completed. In contrast to the current state of the art, the invention allows for a longer reaction time from the detection process to the information to the receiver as in the current state of the art the sender needs to inform (e.g., by intercepting/preempting the message transmission) the receiver of transmission failures while the message transmission is still ongoing. As a consequence the presented technique allows simpler implementations as well as implementations with higher communication speeds.

Advantageous aspects of the method, the network, the sender and the receiver according to the invention, which can be realized on its own or in any combination for the network and/or the method and for the sender and/or the receiver, as far as these features relate to the sender or receiver, are the following:
Said sender informs said at least one receiver of the at least one message by signaling at least one attribute that is related to the result of said correctness check to said at least one receiver, and wherein said at least one receiver receives said at least one attribute and discards said at least one message, if according to the at least one attribute the result of the correctness check has been negative. For example, the at least one attribute contains information, in particular data describing said information, where this information describes the result of said correctness check.
Said attributes are transmitted from said sender to said at least one receiver with at least one control message.
Said at least on attribute contains, in the case of a negative correctness check, additional information referring to the type and/or position of an error in said at least one message.

Said sender informs said at least one receiver of a negative result of the correctness check by not signaling an attribute that is related to the result of said correctness check to the at least one receiver, and wherein said at least one receiver discards said at least one message, when it does not receive an attribute that is related to the result of the correctness check of said at least one message, in particular from the sender of said at least one message, within a defined period of time after the receipt of said at least one message.

The state of a physical layer for communication between said sender and said at least one receiver is permanently active or which remains active after said at least one message has been sent by the sender to the at least one receiver.

In case of a negative result of the correctness check said at least one receiver is informed by said sender in that the state of the physical layer is set from active to inactive, preferably in that said sender de-activates said physical layer or sets the state of said physical layer to inactive. In this case, for example, a receiver discards a received message, if the physical layer is deactivated within a defined period of time after the receipt of said message.

A sender comprises at least two units, wherein a first unit transmits and/or relays data in form of messages, and wherein second unit monitors the behavior of the first unit, preferably using information channels. Thus, the first unit acts as commander; and the second unit acts as monitor.

A sender signals the result of a correctness check, preferably the at least one attribute related to the result of said correctness check, to the at least one receiver by way of at least one control message.

Said at least one control message is generated and/or forwarded by said first unit.

The second unit is adapted to block the transmission of control messages and/or to modify the transmission of control messages. This optional feature is based on the assumption that only one unit, the first or the second unit, may be faulty at the same time.

The message-oriented communication is based on Ethernet.

The physical layer is an Ethernet physical layer.

The at least one sender sends messages according to a time-triggered paradigm.

The process of informing the at least one receiver of the result of said correctness check by a sender follows a time-triggered principle.

The time-triggered principle is realized by the sender and the at least one receiver being timely synchronized to each other, wherein the sender is sending control messages at pre-configured points in time, and wherein the receiver is expecting to receive the control messages at pre-configured points in time.

A receiver discards a message related to at least one control message when said receiver does not receive said at least one control message at a pre-configured point in time at which said at least one control message is expected to being received.

The time-triggered principle is realized by the sender and the at least one receiver being timely synchronized to each other, and wherein the sender informs the receiver of the negative result of the correctness check by disabling the physical layer at a pre-configured point in time for a pre-configured duration, and wherein the receiver discards messages as response to said disabling of the physical layer.

The present invention discloses a method and network to realize self-checking components for use in communication networks that base their communication on the exchange of messages. The invention describes a technique used to signal failures detected in a sending component resulting of a sender self-check to a receiving component. The invention discloses how to architect fault-tolerant networks by use of said self-checking methods and devices.

BRIEF DESCRIPTION OF THE DRAWINGS

The specific features and advantages of the present invention will be better understood through the following description. In the following, the present invention is described in more detail, in particular with reference to exemplary embodiments (which are not to be construed as limitative) depicted in drawings:

FIG. 1 shows two components of a computer network, according to the state-of-the art, FIG. 1a shows four components of a computer network, according to the state-of-the art, FIG. 2 shows a realization of a self-checking design of a component of a computer network according to the state-of-the art, FIG. 3 shows the self-checking design of the component shown in FIG. 2 in operation.

FIG. 1 depicts two components 201, 202 of a network, in particular a computer network, according to the state-of-the art, wherein the components 201, 202 are connected to each other by a communication link 110. In this example component 201 is designed as a self-checking pair. Component 201 acts as a sender of information to component 202, which component 202 is the receiver of said information. Component 202 may also be constructed as a self-checking pair. The information may be communicated on the communication link 110 using a message-oriented communication paradigm. An example for a message-oriented communication paradigm is Ethernet according the IEEE 802.3 standard.

The present invention may use a message-oriented communication paradigm according to Ethernet, but is not limited to Ethernet.

FIG. 1a depicts four components 201, 501, 502, 503 of a network, in particular a computer network, according to the state-of-the art, connected to each other by a communication link 110. In this example component 201 is designed as self-checking pair. Component 201 is also a sender of information to a component which is the receiver of the information. Each of the components 501, 502, 503 may also be constructed as a self-checking pair. The information is communicated on the communication link 110 using a message-oriented communication paradigm. An example for a message-oriented communication paradigm is Ethernet according the IEEE 802.3 standard.

FIG. 2 depicts a possible realization of a self-checking design of component 201 according to the state-of-the art. As depicted component 201 is composed of three units,
- a first unit COM acting as a commander,
- a second unit MON acting as a monitor, and
- a third unit SW acting as a kind of an on/off-switch or as an on/off-switch.

The units are connected to each other with information links A101, A102, A103, A104. The first unit COM produces information that is to be sent in form of messages via link A101 and the third unit SW to a communication link 110. The second unit MON is able to monitor the information produced by the first unit COM on link A101 using the information link A102. The second unit MON implements correctness checks based on the monitoring on link A102. As a result of the correctness checks the monitor (second unit) MON can enable or disable the information from the first unit COM to propagate from link A101 to link 110. The second unit MON is doing so by operating the element SW via the information link A103.

FIG. 3 depicts the self-checking design of component 201 shown in FIG. 2 in operation. FIG. 3 shows an example where the first unit COM produces a faulty message M101 having an error E101. The message is forwarded on the information channel A102 and checked by the monitor MON. The monitor MON realizes that the message M101 is faulty and instructs the third unit SW to change from an OPEN to a CLOSE state. By doing so, the third unit SW truncates the message M101 to a resulting message M102. A receiver is now able to identify the received message M102 to be faulty, for example by classifying the message M102 being too short, or by realizing that the message M102 violates message rules, or by message M102 having an invalid message checksum such as a frame check sequence in Ethernet.

Figure 4:
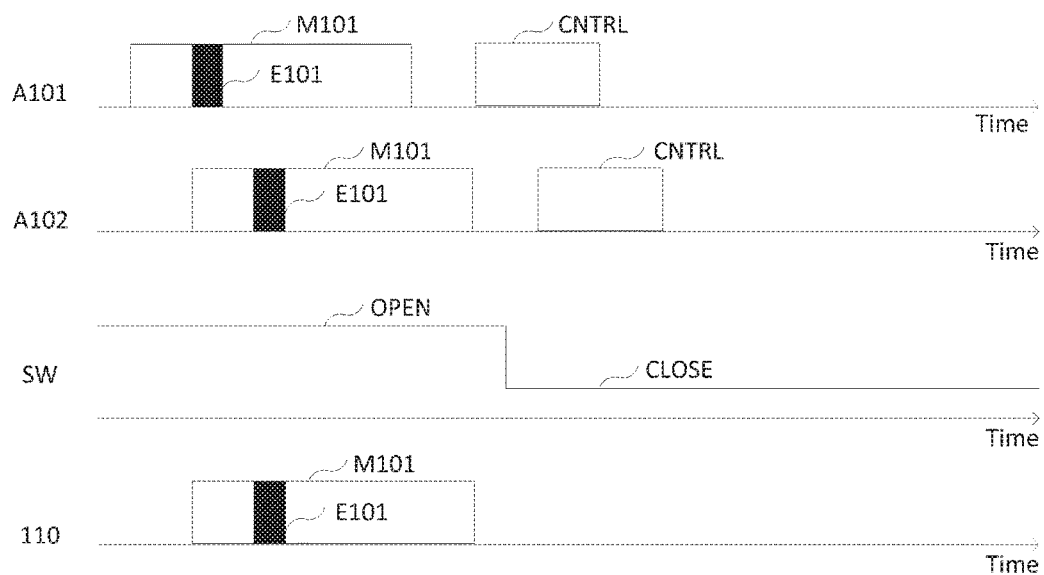
FIG. 4 shows a method according to the invention.

The downside of this state-of-the-art self-checking pair design is in the required short error reaction time of the monitor MON: the faulty message M101 must be truncated before it is been sent completely to the communication link 110. Otherwise, the message being sent to a receiver cannot be recognized as faulty by the receiver. To overcome the requirement of the short error reaction time of the MON FIG. 4 depicts a novel approach to signal the error E101 in a faulty message M101 from a sender to a receiver. Here, not the faulty message M101 itself is modified by a monitor MON interacting with the sending process using the third unit SW. Instead, the first unit COM sends an additional, so-called control message CNTRL following message M101. The receiver will only accept message M101 if it also receives the following control message CNTRL message. Otherwise, if the receiver does not receive the control CNTRL message it will also discard message M101.

In the scenario depicted in FIG. 4, the message M101 is indeed faulty. The sender 201 executes a correctness check of the message M101 by the monitor MON, and said monitor MON detects the error E101. The monitor will thus instruct the third unit SW to close communication from the first unit COM to the communication link 110. In contrast to FIG. 3, it is not necessary that the message M101 is truncated, since the control message CNTRL is blocked from being sent on the communication link 110. The receiver will wait for a defined period (in particular, a period equal or longer than the worst-case time it takes the receiver to receive the CNTRL message in the case when message M101 would not have been faulty) and drop message M101 when this period expires.

In the scenario of FIG. 4 the sender informs the receiver of the result of the correctness check of the message being sent by sending or not sending a control message CNTRL.

Figure 5:
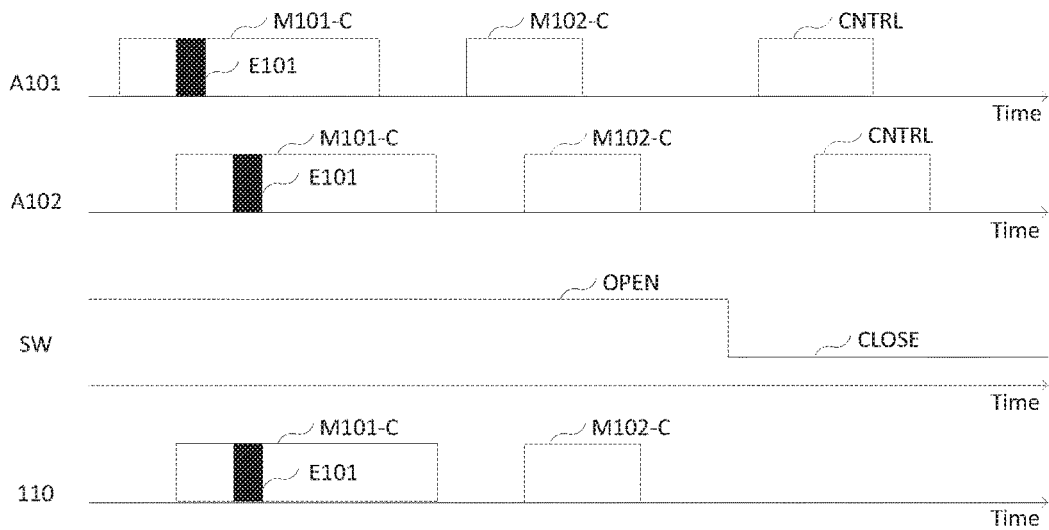
FIG. 5 shows another use case of the method described in FIG. 4.

FIG. 5 depicts another use case of the novel signaling method described in FIG. 4. In the scenario a FIG. 5, not every message M101-C has its dedicated control message CNTRL, but rather a defined set of messages M101-C, M102-C uses the same control message CNTRL. Analogous to FIG. 4, here in FIG. 5 a receiver may only accept a set of messages M101-C, M102-C if it also receives the respective control message CNTRL, in particular within an upper bound in time after the messages M101-C, M102-C. As depicted in FIG. 5, message M101-C is faulty with error E101. Thus, the monitor MON will instruct the third unit SW to block the control message CNTRL. A receiver of the messages M101-C and M102-C will, thus, mark these messages as being faulty, and potentially discard them.

Figure 6:
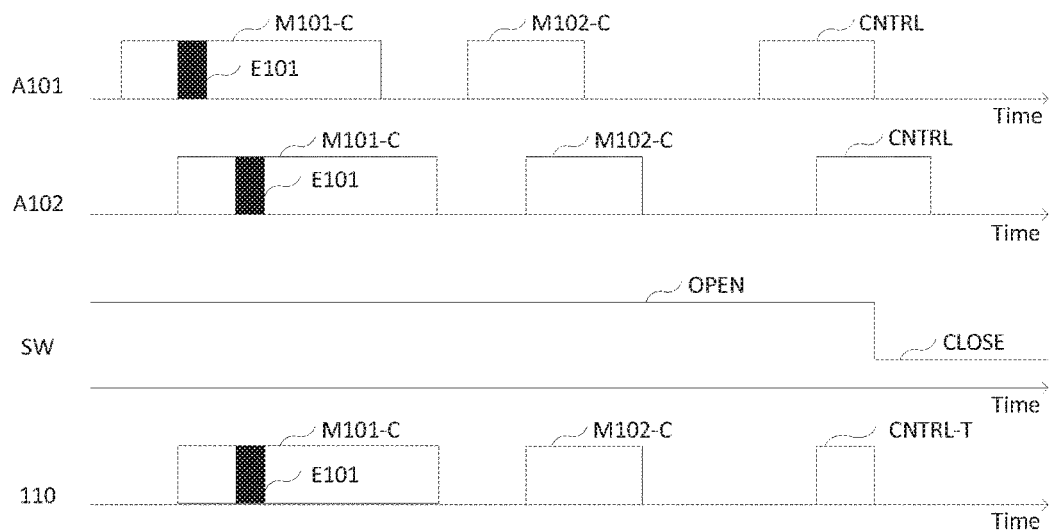
FIG. 6 shows a variant of the scenario depicted in FIG. 5.

FIG. 6 depicts a variant of the scenario depicted in FIG. 5. Here, the control message CNTRL is truncated by the third unit SW as a means to signal an error E101 in one of the preceding messages, in this case M101-C. The receiver uses the reception of the truncated frame CNTRL-T of the control message CNTRL as a signal to mark the preceding messages M101-C and M102-C as being faulty and potentially discarding these frames.

Figure 7:
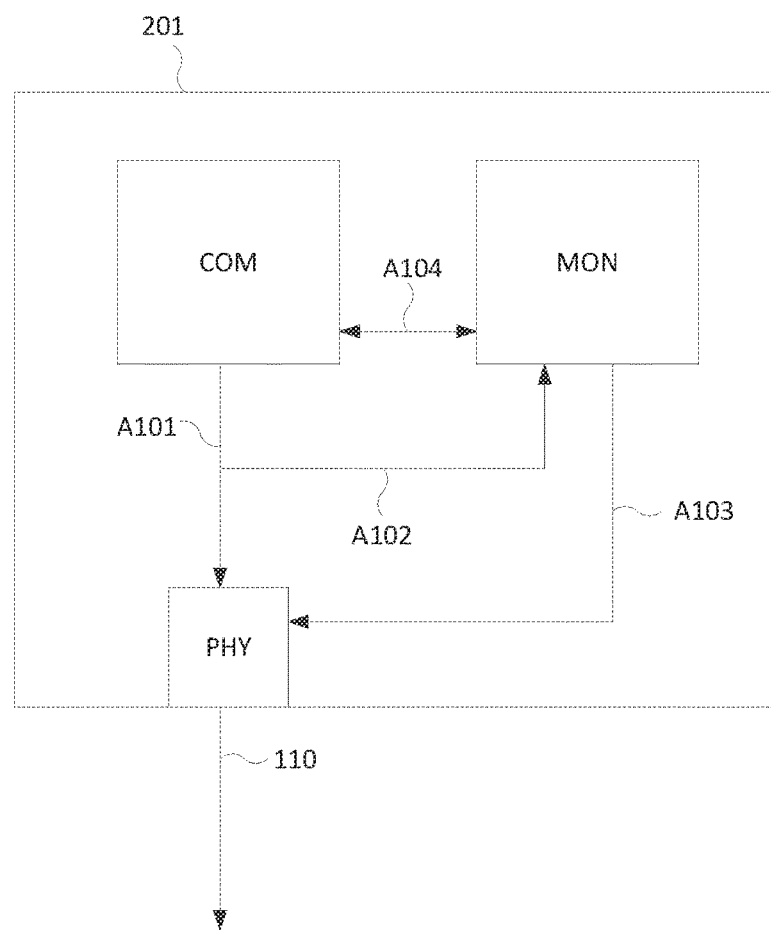
FIG. 7 shows another realization of the self-checking pair design of a sender.

FIG. 7 depicts another realization of the self-checking pair design of a sender 201. In this case, the communication links 110 are Ethernet links and the third unit SW is realized by an Ethernet physical layer PHY. This realization of the invention is concerned with those physical layers in Ethernet that are always active, whether data has to be transmitted or not. Now, when the monitor MON during the correctness check of a message detects a faulty message from the first unit COM via the link A102, then it instructs the physical layer PHY via link A103 to terminate the connection to the receiver. Thus, the termination of the physical layer connection (i.e., setting the physical layer from an ACTIVE state to an INACTIVE state) can be used as a signal from the sender to the receiver, with which signal the receiver is informed of the result of the correctness check. In one realization of this embodiment, this signal is used to indicate that one or several messages sent prior to the link termination have been faulty.

Figure 7A:
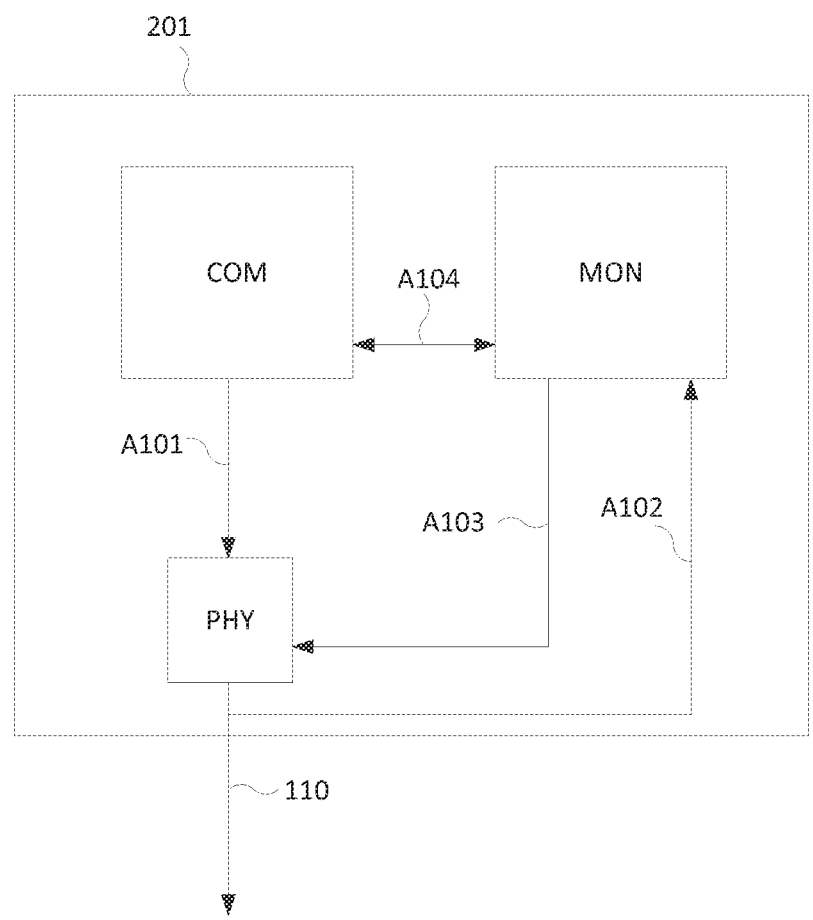
FIG. 7a shows a similar setting as described in FIG. 7.

FIG. 7a depicts the same setting as described in FIG. 7 with the one difference, that the monitor MON monitors the signal 110 instead the signal A101, via A102. In the most general case the monitoring via A102 may be executed at any point in the communication process (e.g., in a node local bus, an MII interface, or directly on the output of the physical layer PHY).

Figure 8:
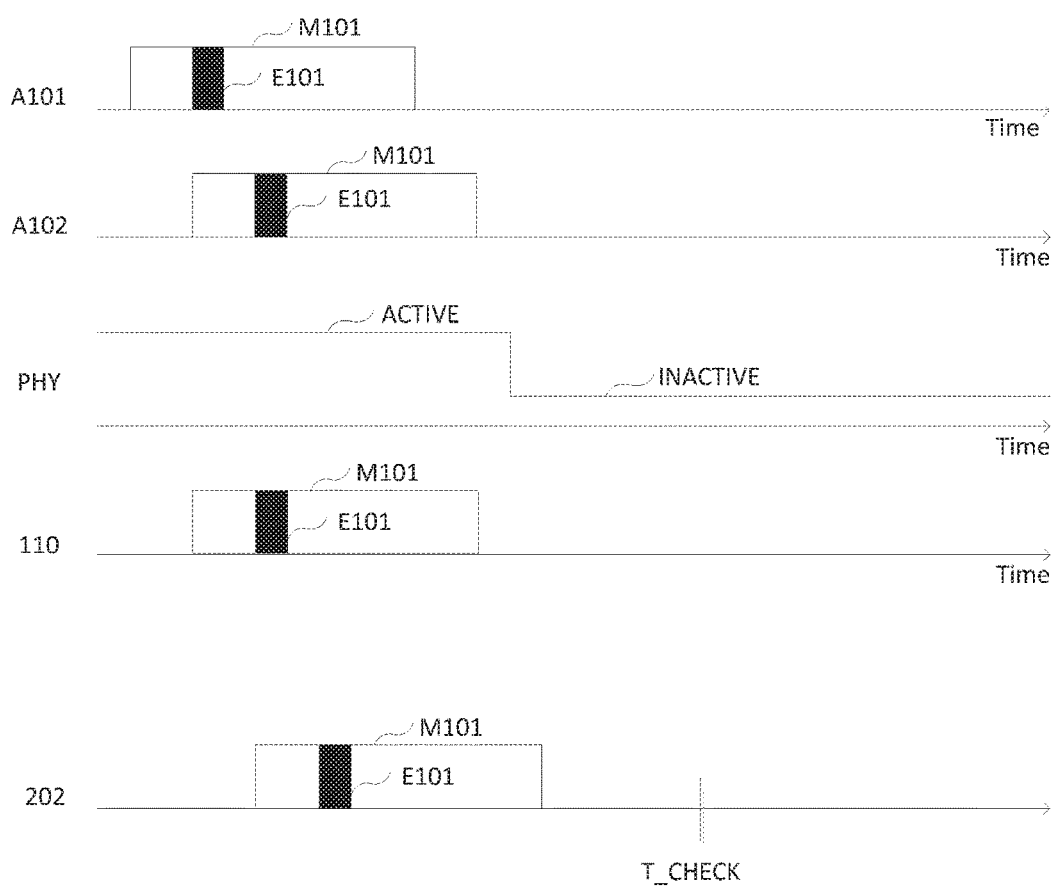
FIG. 8 shows a scenario of the self-checking pair realization of FIG. 7.

FIG. 8 depicts a scenario of the self-checking pair realization of FIG. 7. Here a message M101 is faulty with error E101 and the monitor MON detects the failure by listening to the monitor via information channel A102. As a response to the faulty message the monitor MON instructs the physical layer PHY to disable the connection to the receiver (state change from ACTIVE to INACTIVE). Using the physical layer signaling, the receiver will only use messages M101 from a sender 201 if the physical link connection is still active a defined duration after the reception of the one or more messages M101. In the scenario depicted in FIG. 8, the monitor MON terminates the physical layer connection, and thus, the receiver 202 realizes that the physical link connection has been terminated at a point in time T_CHECK and, thus, identifies the message M101 as being faulty. The receiver 202 may discard this message M101.

Figure 9:
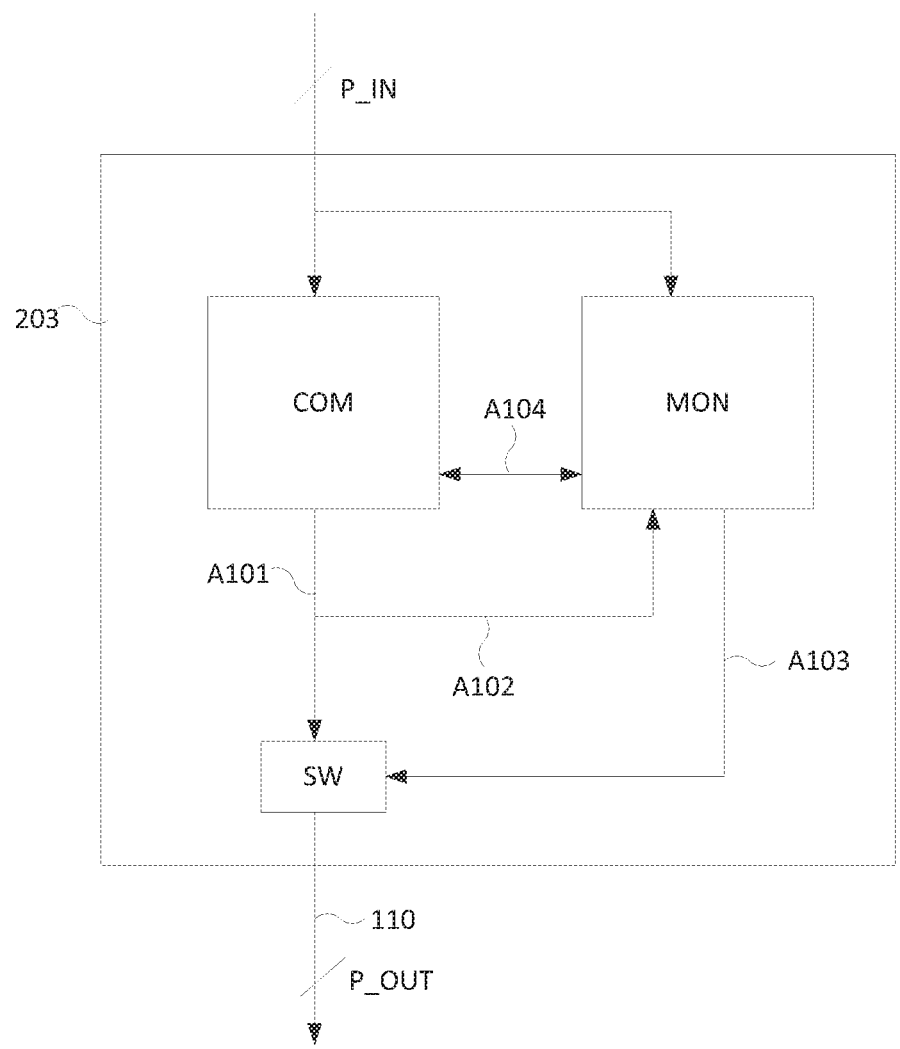
FIG. 9 shows the application of the self-checking design to a network switch.

FIG. 9 depicts the application of the self-checking design to a network switch 203, for example an Ethernet switch, router, starcoupler, or similar device. The network switch 203 has several input ports P_IN and output ports P_OUT. In a concrete implementation pairs of one input and one output port of the set of input and output ports may form a physical connection to the network switch 203. FIG. 9 depicts a logical representation of the network switch 203, thus represents input ports and output ports at different locations. In case of a network switch 203 the first unit COM will forward messages, e.g., Ethernet messages, from input ports to output ports. The monitor MON will control whether this relay of messages by the first unit COM is done correctly. For example, the monitor MON will use the information channel A102 to check whether the first unit COM sends messages to the wrong output ports or whether the COM aims to send messages that it did not receiver before. In this case the monitor MON executes a correctness check of the transmission process of the message inside the network switch/sender 203. In case the monitor MON detects a failure, the monitor MON will inform one or multiple components attached to the output ports P_OUT using the procedures described in FIG. 4-FIG. 8.

Figure 10:
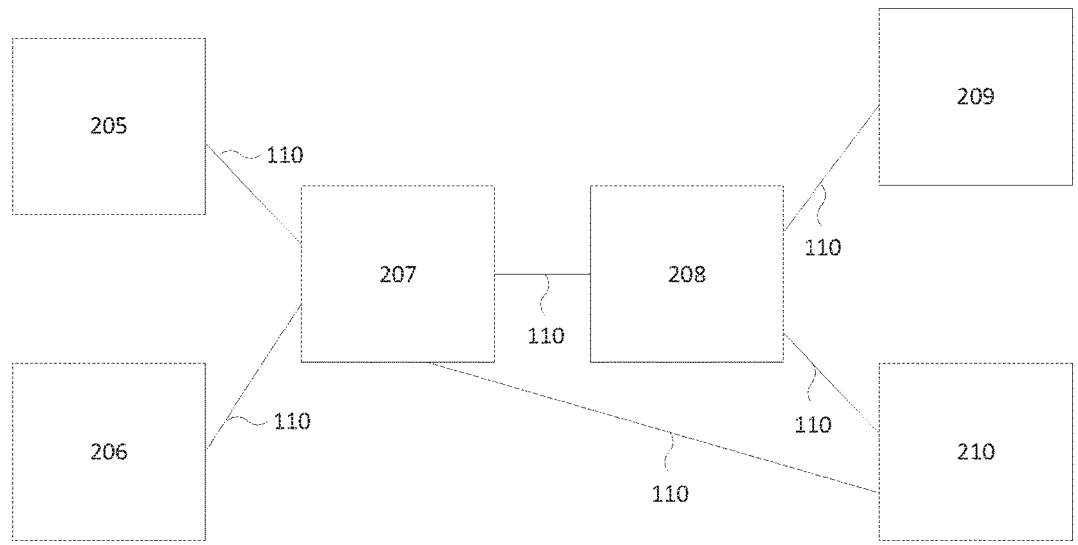
FIG. 10 shows a use case of the design principle as discussed in FIG. 9 in a network switch.

FIG. 10 depicts a use case of the design principle as discussed in FIG. 9 in a network switch 207, 208. In particular, FIG. 10 depicts an example network consisting of end nodes 205, 206, 209, 210, and network switches 207, 208 connected to each other using communication links 110. Both, end nodes 205, 206, 209, 210 and network switches 207, 208 can be realized according to the self-checking design presented above. In particular, end nodes and switches can be connected to each other with more than one communication link, in the example according to FIG. 10 end node 210 is connected to both network switches 207 and 208 by different communication links 110.

Figure 11:
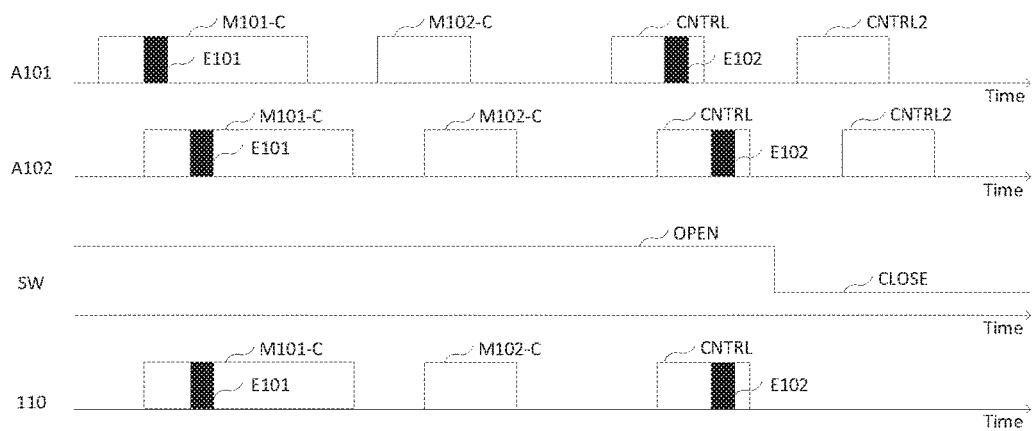
FIG. 11 shows an extension to the signaling mechanism according to the present invention.

FIG. 11 depicts an extension to the signaling mechanism presented in this invention. Here a control message CNTRL is not only used to identify that a preceding message M101-C has been faulty, but also contains information regarding the type of the failure. Thus, the control message CNTRL can be used for diagnostics in a receiver. However, CNTRL itself may be faulty with some error E102, thus potentially providing faulty diagnosis information. The sender can thus send a second control message CNTRL2 for the sake to verify the correctness of the CNTRL message. In the scenario of FIG. 11, both, message M101-C and first control message CNTRL are assumed to be faulty. Thus, the monitor MON blocks the transmission of the message CNTRL2. Consequently, the receiver classifies the CNTRL2 message as being faulty.

The invention claimed is:

1. A method to detect and to handle failures of communications in a computer network, wherein said computer network comprises at least one sender (201, 203) and at least one receiver (202, 501, 502, 503), and wherein a communication between said at least one sender (201, 203) and said at least one receiver (202, 501, 502, 503) is message-oriented, the method comprising:
sending, by a sender (201, 203) of the at least one sender, at least one message (M101, M101-C, M102-C) to the at least one receiver (202, 501, 502, 503);
monitoring, by said sender (201, 203), a transmission process of said at least one message inside the sender and/or monitoring said at least one message (M101, M101-C, M102-C);
executing, by said sender (201), a correctness check of contents of said at least one message and/or a correctness check of the transmission process of said at least one message inside the sender (203);
informing, by the sender and after the correctness check of said at least one message and/or the correctness check of the transmission process of said at least one message inside the sender has been completed, said at least one receiver (202, 501, 502, 503) of a result of said correctness check or said correctness checks, and
marking, by the at least one receiver (202, 501, 502, 503) of the at least one message (M101, M101-C, M102-C), said at least one message as being faulty and/or discarding said at least one message if the result of the correctness check indicates that said message and/or the transmission process of said message inside the sender is faulty,
wherein (i) said sender (201, 203) informs said at least one receiver (202, 501, 502, 503) of a negative result of the correctness check by not signaling an attribute that is related to the result of said correctness check to the at least one receiver (202, 501, 502, 503), and wherein said at least one receiver (202, 501, 502, 503) discards said at least one message when it does not receive an attribute that is related to the result of the correctness check of said at least one message from the sender (201, 501, 502, 503) of said at least one message (M101, M101-C, M102-C) within a defined period of time after the receipt of said at least one message (M101, M101-C, M102-C), or
(ii) a state of a physical layer (PHY) for communication between said sender (201, 203) and said at least one receiver (202, 501, 502, 503) is permanently active (ACTIVE) or which remains active (ACTIVE) after said at least one message (M101, M101-C, M102-C) has been sent by the sender (201) to the at least one receiver (202, 501, 502, 503), wherein in case of a negative result of the correctness check said at least one receiver (202, 501, 502, 503) is informed by said sender (201, 203) in that the state of the physical layer (PHY) is set from active (ACTIVE) to inactive (INACTIVE), in that said sender (201, 203) de-activates said physical layer or sets the state of said physical layer to inactive.

2. The method of claim 1, wherein said sender (201, 203) informs said at least one receiver (202, 501, 502, 503) of the at least one message (M101, M101-C, M102-C) by signaling at least one attribute that is related to the result of said correctness check to said at least one receiver (202, 501, 502, 503), and wherein said at least one receiver (202, 501, 502, 503) receives said at least one attribute and discards said at least one message, if according to the at least one attribute the result of the correctness check has been negative wherein said attributes are transmitted from said sender (201, 203) to said at least one receiver (202, 501, 502, 503) with at least one control message (CNTRL, CNTRL2).

3. The method of claim 2, wherein said at least one attribute comprises, in the case of a negative correctness check, additional information referring to a type and/or position of an error in said at least one message (M101, M101-C, M102-C).

4. The method of claim 1, wherein the sender comprises at least two units (COM, MON), wherein a first unit (COM) transmits and/or relays data as messages, and wherein a second unit (MON) monitors a behavior of the first unit (COM) using information channels (A102, A104), wherein said at least one control message (CNTRL, CNTRL2) is generated and/or forwarded by said first unit (COM).

5. The method of claim 4, wherein the sender (201, 203) signals the result of the correctness check comprising the at least one attribute related to the result of said correctness check, to the at least one receiver (202, 501, 502, 503) by way of the at least one control message (CNTRL, CNTRL2), wherein said at least one control message (CNTRL, CNTRL2) is generated and/or forwarded by said first unit (COM).

6. The method of claim 4, wherein the second unit (MON) is adapted to block a transmission of control messages (CNTRL, CNTRL2) and/or to modify the transmission of control messages (CNTRL, CNTRL2).

7. The method of claim 1, wherein the message-oriented communication is based on Ethernet.

8. The method of claim 1, wherein the physical layer is an Ethernet physical layer (PHY).

9. The method of claim 1, wherein the at least one sender sends messages (M101, M101-C, M102-C) according to a time-triggered paradigm.

10. The method of claim 1, wherein the process of informing the at least one receiver (202, 501, 502, 503) of the result of said correctness check by the sender (201, 203) follows a time-triggered principle, wherein the time-triggered principle is realized by the sender and the at least one receiver being timely synchronized to each other, and wherein the sender informs the at least one receiver of the negative result of the correctness check by disabling the physical layer (PHY) at a pre-configured point in time for a pre-configured duration, and wherein the at least one receiver discards messages as a response to said disabling of the physical layer (PHY).

11. The method of claim 10, wherein the time-triggered principle is realized by the sender and the at least one receiver being timely synchronized to each other, wherein the sender is sending control messages (CNTRL, CNTRL2) at pre-configured points in time, and wherein the at least one receiver is expecting to receive the control messages (CNTRL, CNTRL2) at pre-configured points in time, and wherein the at least one receiver discards a message related to at least one control message (CNTRL, CNTRL2) when said at least one receiver does not receive said at least one control message (CNTRL, CNTRL2) at a pre-configured point in time at which said at least one control message is expected to being received.

12. A computer network, comprising: at least one sender (201, 203) and at least one receiver (202, 501, 502, 503), wherein a communication between said at least one sender (201, 203) and said at least one receiver (202, 501, 502, 503) is message-oriented for detecting and handling failures in the communication in said network,
 a sender (201, 203) of the at least one sender configured to send at least one message (M101, M101-C, M102-C) to at least one receiver (202, 501, 502, 503),
 said sender (201, 203) configured to monitor a transmission process of said at least one message inside the sender and/or monitor said at least one message (M101, M101-C, M102-C),
 said sender (201) configured to execute a correctness check of the contents of said at least one message and/or execute the correctness check of a transmission process of said at least one message inside the sender (203),
 after the correctness check of said at least one message and/or of correctness check of the transmission process of said at least one message inside the sender has been completed, the sender (201, 203) is configured to inform said at least one receiver (202, 501, 502, 503) of the result of said correctness check or said correctness checks, and
 the at least one receiver (202, 501, 502, 503) of the at least one message (M101, M101-C, M102-C) is configured to mark said at least one message as being faulty and/or discard said at least one message if the result of the correctness check indicates that said message and/or the transmission process of said message inside the sender is faulty,
 wherein (i) said sender (201, 203) informs said at least one receiver (202, 501, 502, 503) of a negative result of the correctness check by not signaling an attribute that is related to the result of said correctness check to the at least one receiver (202, 501, 502, 503), and wherein said at least one receiver (202, 501, 502, 503) is configured to discard said at least one message when it does not receive an attribute that is related to the result of the correctness check of said at least one message from the sender (201, 501, 502, 503) of said at least one message (M101, M101-C, M102-C) within a defined period of time after the receipt of said at least one message (M101, M101-C, M102-C), or
 (ii) the state of a physical layer (PHY) for communication between said sender (201, 203) and said at least one receiver (202, 501, 502, 503) is permanently active (ACTIVE) or which remains active (ACTIVE) after said at least one message (M101, M101-C, M102-C) has been sent by the sender (201) to the at least one receiver (202, 501, 502, 503), wherein in case of a negative result of the correctness check said at least one receiver (202, 501, 502, 503) is informed by said sender (201, 203) in that the state of the physical layer (PHY) is set from active (ACTIVE) to inactive (INACTIVE), in that said sender (201, 203) de-activates said physical layer or sets the state of said physical layer to inactive.

13. The network of claim 12, wherein said sender (201, 203) is configured to inform said at least one receiver (202, 501, 502, 503) of the at least one message (M101, M101-C, M102-C) by signaling at least one attribute that is related to the result of said correctness check to said at least one receiver (202, 501, 502, 503), and wherein said at least one receiver (202, 501, 502, 503) is configured to receive said at least one attribute and discard said at least one message if according to the at least one attribute, the result of the correctness check are negative, wherein said attributes are transmitted from said sender (201, 203) to said at least one receiver (202, 501, 502, 503) with at least one control message (CNTRL, CNTRL2).

14. The network of claim 13, wherein said at least on attribute comprises, in the case of a negative correctness check, additional information referring to the type and/or position of an error in said at least one message (M101, M101-C, M102-C).

15. The network of claim 12, wherein the sender comprises at least two units (COM, MON), wherein a first unit (COM) is configured to transmit and/or relay data as messages, and wherein a second unit (MON) is configured to monitor a behavior of the first unit (COM) using information channels (A102, A104), wherein said at least one control message (CNTRL, CNTRL2) is generated and/or forwarded by said first unit (COM).

16. The network of claim 15, wherein the sender (201, 203) signals the result of a correctness check comprising the at least one attribute related to the result of said correctness check, to the at least one receiver (202, 501, 502, 503) by way of at least one control message (CNTRL, CNTRL2), wherein said at least one control message (CNTRL, CNTRL2) is generated and/or forwarded by said first unit (COM).

17. The network of claim 15, wherein the second unit (MON) is adapted to block the transmission of control messages (CNTRL, CNTRL2) and/or to modify the transmission of control messages (CNTRL, CNTRL2).

18. The network of claim 12, wherein the message-oriented communication is based on Ethernet.

19. The network of claim 12, wherein the physical layer is an Ethernet physical layer (PHY).

20. The network of claim 12, wherein the at least one sender sends messages (M101, M101-C, M102-C) according to a time-triggered paradigm.

21. The network of claim 12, wherein informing the at least one receiver (202, 501, 502, 503) of the result of said correctness check by the sender (201, 203) follows a time-triggered principle, wherein the time-triggered principle is realized by the sender and the at least one receiver being timely synchronized to each other, and wherein the sender informs the at least one receiver of the negative result of the correctness check by disabling the physical layer (PHY) at a pre-configured point in time for a pre-configured duration, and wherein the at least one receiver discards messages as response to said disabling of the physical layer (PHY).

22. The network of claim 21, wherein the time-triggered principle is realized by the sender and the at least one receiver being timely synchronized to each other, wherein the sender is configured to send control messages (CNTRL, CNTRL2) at pre-configured points in time, and wherein the receiver is configured to expect to receive the control messages (CNTRL, CNTRL2) at pre-configured points in time, and wherein the at least one receiver discards a message related to the at least one control message (CNTRL, CNTRL2) when said at least one receiver does not receive said at least one control message (CNTRL, CNTRL2) at a pre-configured point in time at which said at least one control message is expected to be received.

23. A sender for the network of claim 12, wherein the sender is adapted to
   send at least one message (M101, M101-C, M102-C) to the at least one receiver (202, 501, 502, 503), and
   to monitor the transmission process of said at least one message inside the sender and/or said at least one message (M101, M101-C, M102-C), and
   to execute the correctness check of the contents of said at least one message, and/or to execute the correctness check of the transmission process of said at least one message inside the sender (203), and
   after the correctness check of said at least one message and/or of correctness check of the transmission process of said at least one message inside the sender has been completed, to inform said at least one receiver (202, 501, 502, 503) of the result of said correctness check or said correctness checks.

24. A receiver of the at least one receiver of the network of claim 12, wherein the receiver is adapted to mark a message received from the sender as being faulty and/or discards said message if the result of the correctness check carried out by said sender indicates that said message and/or the transmission process of said message inside the sender is faulty.

* * * * *